United States Patent
Atkinson

(10) Patent No.: US 9,376,187 B2
(45) Date of Patent: Jun. 28, 2016

(54) POWER MODULE FOR USE IN MARINE VESSEL, AND WIND-PROPELLED VESSEL PROVIDED WITH SAID POWER MODULE

(75) Inventor: Gregory Mark Atkinson, Fukuoka (JP)

(73) Assignee: ECO MARINE POWER CO. LTD., Fukuoka (JP)

( * ) Notice: Subject to any disclaimer, the term of this patent is extended or adjusted under 35 U.S.C. 154(b) by 166 days.

(21) Appl. No.: 13/881,523

(22) PCT Filed: Oct. 26, 2011

(86) PCT No.: PCT/JP2011/074619
§ 371 (c)(1),
(2), (4) Date: Jun. 25, 2013

(87) PCT Pub. No.: WO2012/057178
PCT Pub. Date: May 3, 2012

(65) Prior Publication Data
US 2014/0144362 A1    May 29, 2014

(30) Foreign Application Priority Data
Oct. 26, 2010   (JP) ................................. 2010-239392

(51) Int. Cl.
| | | |
|---|---|---|
| B63H 9/04 | (2006.01) |
| B63H 9/06 | (2006.01) |
| H02S 20/30 | (2014.01) |
| H02S 30/20 | (2014.01) |
| B63H 21/17 | (2006.01) |
| B63J 3/00 | (2006.01) |

(52) U.S. Cl.
CPC ................ B63H 9/06 (2013.01); B63H 9/0607 (2013.01); *B63B 2209/18* (2013.01); *B63H 2009/0635* (2013.01); *B63H 2021/171* (2013.01); *B63J 2003/003* (2013.01); *H02S 20/30* (2014.12);

(Continued)

(58) Field of Classification Search
CPC .............. B63H 2009/0621; B63H 2009/0628; B63H 2009/0635; B63H 9/1021; B63H 9/1025; B63H 9/1092; B63H 9/1035; H02S 30/20; H02S 20/30
USPC .......................... 114/102.15, 102.16, 102.17
See application file for complete search history.

(56) References Cited

U.S. PATENT DOCUMENTS

| | | | |
|---|---|---|---|
| 2,234,723 A | 10/1939 | Dickey et al. |
| 2,783,398 A * | 2/1957 | Haas et al. ...................... 310/57 |

(Continued)

FOREIGN PATENT DOCUMENTS

| | | | |
|---|---|---|---|
| CA | 1049856 A  * | 3/1979 |
| CA | 1049856 A1 * | 3/1979 |

(Continued)

OTHER PUBLICATIONS

PCT/JP2011/074619, International Search Report mailed Feb. 7, 2012, 2 pages—English, 3 pages—Japanese.

*Primary Examiner* — Andrew Polay
(74) *Attorney, Agent, or Firm* — Andrew F. Young, Esq.; Lackenbach Siegel, LLP

(57) ABSTRACT

Provided is a power module for use in a marine vessel and a wind-propelled vessel provided with such a power module. The power module includes: a sail storage housing which has at least a portion thereof arranged below a deck of a marine vessel and having an opening on an upper end thereof; a sail which is movable between a storage position located inside the sail storage housing and a use position at which the sail projects from the deck in the vertical direction; and a sail movement unit which is configured to move the sail between the storage position and the use position.

10 Claims, 15 Drawing Sheets

(52) U.S. Cl.
CPC .............. *H02S 30/20* (2014.12); *Y02T 70/5245* (2013.01); *Y02T 70/70* (2013.01)

(56) References Cited

U.S. PATENT DOCUMENTS 5,570,651 A * 11/1996 Schiff .............................. 114/91
8,664,511 B2 * 3/2014 Swatek et al. ................ 136/244

FOREIGN PATENT DOCUMENTS

| EP | GB 2234723 | 2/1991 |
|----|------------|--------|
| JP | 57-178994 | 11/1982 |
| JP | 58-4696 | 1/1983 |
| JP | U 59-9500 | 6/1984 |
| JP | 4-331694 | 11/1992 |

* cited by examiner

POWER MODULE FOR USE IN MARINE VESSEL, AND WIND-PROPELLED VESSEL PROVIDED WITH SAID POWER MODULE

CROSS REFERENCE TO RELATED APPLICATIONS

This application relates to and claims priority from International Application Ser. No. PCT/JP2011/074619 filed Oct. 26, 2011, the entire contents of which are incorporated herein by reference which in turn claims priority to JP Ser. No. 2010-239392 filed Oct. 26, 2010.

BACKGROUND OF THE INVENTION

1. Field of the Invention

The present invention relates to a power module for use in a marine vessel which is mounted on a deck of the marine vessel, and more particularly to a power module for use in a marine vessel which makes use of wind power and solar energy for propelling a marine vessel using sails, and a wind-propelled vessel provided with the power module for use in a marine vessel.

2. Description of the Related Art

Recently, a marine vessel, particularly, a large-sized marine vessel such as a bulk carrier consumes a large amount of fossil fuel and hence, the vessel is considered as one of main sources discharging carbon dioxide and air pollution.

As a means for preventing the consumption of a large amount of fossil fuel and reducing air pollution by such a large marine vessel, there has been known a large-sized wind-propelled vessel which the University of Tokyo developed recently. This large-sized wind-propelled vessel is configured such that a plurality of gigantic sails are installed on a deck, and a propelling force is obtained by controlling the respective sails by a computer. These sails are vertically extensible and retractable such that the sails are extended so as to fully make use of wind power when the marine vessel is propelled and the sails are retracted so as to prevent the wind from affecting the sails as much as possible when the marine vessel is not propelled or the like.

On the other hand, British patent 2234723 (patent literature 1) discloses a small-sized marine vessel which makes use of solar energy. The small-sized marine vessel is configured such that a plurality of sails are raised or lowered on a frame which is transversely mounted on a hull, and solar power generation panel is mounted on each sail. By raising or lowering the sails, the sails can be extended so as to fully make use of wind power when the marine vessel is propelled, and the sails can be folded in a horizontal state for preventing the influence of wind power exerted on the vessel when the marine vessel is not propelled as much as possible.

SUMMARY OF THE INVENTION

However, the above-mentioned large-sized wind-propelled vessel has the following drawbacks.

That is, the whole extension and retraction operation of the sail is performed on the deck and hence, the sail largely projects in the vertical direction on the deck even when the sail is in a completely retracted state. Accordingly, there exists a concern that the sail is seriously damaged by cargo or cargo-handling machinery when loading or unloading cargo. Further, the sail largely projects in the vertical direction on the deck even in a completely retracted state and hence, the vessel receives large wind power during storm whereby it is difficult to hold the stability of a hull.

On the other hand, the above-mentioned small-sized marine vessel has the following drawbacks.

That is, the sail can be folded in a horizontal state when the marine vessel is not propelled or the like. However, since the sail is merely folded into a horizontal state from a vertical state, the solar power generation panel mounted on the sail is exposed to wind and rain. Further, this small-sized marine vessel does not require a deck structurally and hence, the small-sized marine vessel differs from the present invention which requires a deck as an indispensable constitutional element with respect to a technical field.

The present invention has been made under such circumstances, and it is an object of the present invention to provide a power module for use in a marine vessel which can fully make the effective use of wind power by fully extending a sail when the marine vessel is propelled, and also can completely prevent a damage on a sail caused by cargo or cargo-handling machinery when loading or unloading cargo by substantially stowing the sail in a deck when the marine vessel is not propelled, and exhibits sufficient weather resistance. It is another object of the present invention to provide a wind-propelled vessel provided with such a power module.

(1) To overcome the above-mentioned conventional drawbacks, according to one aspect of the present invention, there is provided a power module for use in a marine vessel which includes: a sail storage housing which has at least a portion thereof arranged below a deck of a marine vessel and having an opening on an upper end thereof; a sail which is movable between a storage position located inside the sail storage housing and a use position at which the sail projects from the deck in the vertical direction; and a sail movement unit which is configured to move the sail between the storage position and the use position.

(2) In the power module for use in a marine vessel having the above-mentioned constitution (1), the power module may preferably be constituted of a plurality of small-sized power modules having an approximately same shape, and the plurality of small-sized power modules are arranged on the vessel approximately uniformly in a left right symmetry with respect to a longitudinal axis of the marine vessel.

(3) In the power module for use in a marine vessel having the above-mentioned constitution (1), the sail movement unit may preferably include: a sail raising and lowering device which is configured to raise or lower the sail between a horizontal state in the sail storage housing and a vertical state above the deck; a sail extending and retracting device which is configured to extend and retract the sail in a vertical direction; and a sail rotating device which is configured to rotate the sail about a longitudinal axis of the sail extending and retracting device.

(4) In the power module for use in a marine vessel having the above-mentioned constitution (3), the sail movement unit may further preferably includes a sail tilting device which is configured to tilt the sail at a desired angle between a horizontal state and a vertical state above the deck.

(5) In the power module for use in a marine vessel having the above-mentioned constitution (1), the sail storage housing may preferably be arranged along an outer surface or an inner surface of a side wall of a hull.

(6) In the power module for use in a marine vessel having the above-mentioned constitution (1), the sail storage housing may preferably be mounted on an inner wall or an outer wall of a side wall of a hull having the duplicate wall structure which is constituted of the inner wall and the outer wall.

(7) In the power module for use in a marine vessel having the above-mentioned constitution (1), the power module may preferably include a posture control system which controls a posture of the sail at the use position based on a wind speed, a wind direction and information on the marine vessel.

(8) In the power module for use in a marine vessel having the above-mentioned constitution (1), the sail storage housing may preferably have an open/close lid by which the sail storage housing is opened or closed in a waterproof manner.

(9) In the power module for use in a marine vessel having the above-mentioned constitution (1), a solar power generation panel preferably be mounted on a surface of the sail.

(10) In the power module for use in a marine vessel having the above-mentioned constitution (9), the power module may preferably include a battery which stores electric energy obtained by the solar power generation panel.

(11) According to another aspect of the present invention, there is provided a wind-propelled vessel where the power module for use in a marine vessel having any one of the above-mentioned constitutions (1) to (10) is mounted on a deck of the vessel.

DETAILED DESCRIPTION OF PREFERRED EMBODIMENTS

Figure 1:
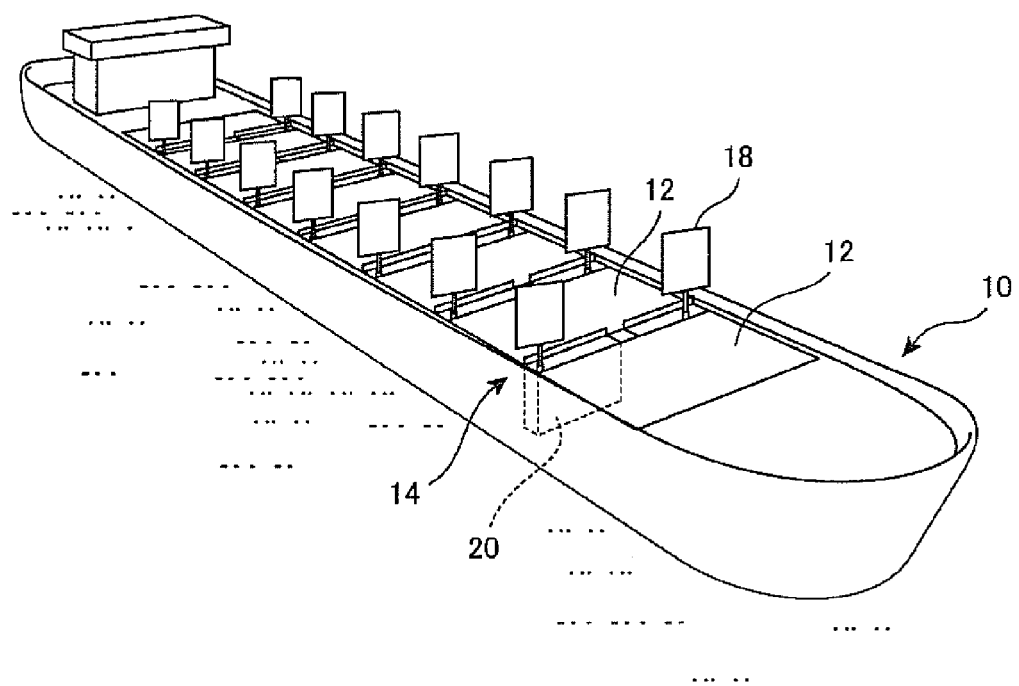
FIG. 1 is a perspective view of a wind-propelled vessel on which a plurality of power modules for use in a marine vessel according to an embodiment 1 of the present invention are mounted.

A power module for use in a marine vessel according to this embodiment includes: a sail storage housing which has at least a portion thereof arranged below a deck of a marine vessel; a sail which is movable between a storage position located inside the sail storage housing and a use position at which the sail projects from the deck in the vertical direction; and a sail movement unit which is configured to move the sail between the storage position and the use position. Accordingly, by fully extending a sail thus fully making use of wind power when the marine vessel is propelled, a use amount of fuel can be further reduced thus preventing air pollution. Further, the sail can be substantially stowed in the deck when the marine vessel is not propelled. Accordingly, in loading or unloading cargo, cargo can be loaded on or unloaded from the marine vessel without being obstructed by the sail and, further, it is possible to completely prevent cargo or cargo-handling machinery from damaging the sail.

Further, the sail can be stowed in the deck and hence, the power module for use in a marine vessel can ensure sufficient weather resistance whereby the maintenance for the power module for use in a marine vessel can be performed easily. Since the sail can be stowed below the deck, the sail does not present a risk to the ship or crew during storms.

For example, when a helicopter is necessary for evacuating a crew in an emergency, the sail can be stowed below the deck and hence, the helicopter can easily and safely land on the marine vessel without being obstructed by the sail.

Further, the power module for use in a marine vessel according to this embodiment may have the split structure constituted of a plurality of small-sized power modules for use in a marine vessel.

In this case, the sail of each divided power module for use in a marine vessel can be made light-weighted and hence, even when the sail is extended at the time of use, the wind-power propelled marine vessel can secure sufficient stability.

Further, in this case, constitutional parts of the power module for use in a marine vessel except for the sail are arranged below the deck and hence, the center of gravity of the whole power module for use in a marine vessel can be held at a low position whereby the stability of the wind-propelled vessel can be enhanced. The center of gravity of the whole power module for use in a marine vessel can be held at a lower position when the sail is stowed and hence, the stability of the wind-propelled vessel can be further enhanced. Further, by arranging a plurality of these power modules for use in a marine vessel in a uniformly distributed manner on the vessel, the stability of the wind-propelled vessel can be further enhanced.

Further, the sail movement unit may be constituted of: a sail raising and lowering device which is configured to raise or lower the sail between a horizontal state and a vertical state; a sail extending and retracting device which is configured to extend and retract the sail in a vertical direction; and a sail rotating device which is configured to rotate the sail about a longitudinal axis of the sail extending and retracting device (about a longitudinal axis of the sail). Further, the sail movement unit may also include a sail tilting device which is capable of tilting the sail at a desired angle between the horizontal state and the vertical state.

In this case, with the use of simple mechanisms, the sail can be easily and surely moved between the use position and the storage position. Further, by rotating the sail about an axis of the sail by the sail rotating device, the sail can be directed in the direction where the sail can obtain the maximum wind power.

The power module for use in a marine vessel may include the posture control system which controls a posture of the sail at the use position based on a wind speed, a wind direction and information on the marine vessel. In this case, the posture of the sail can be controlled by rotating or elevating or lowering the sail in conformity with a state of wind (wind speed, wind direction or the like). That is, the posture of the sail can be controlled in conformity with the state of wind which changes every moment and hence, wind power and solar power can be always utilized optimally.

The sail storage housing may preferably have the waterproof structure where the sail is storable in a waterproof state. In this case, weather resistance of the power module for use in a marine vessel can be enhanced.

The solar power generation panel may be mounted on a surface of the sail. In this case, although electric energy obtained by the solar power generation panel is used for operating systems (air conditioner and the like) and devices (lighting device and the like) on the marine vessel, electric energy may be used as a propelling force for a wind-propelled vessel in the same manner as the wind power. In this case, with the use of a propelling force obtained by wind power and a propelling force obtained by the solar power generation panel, the wind-propelled vessel can obtain a stronger propelling force. Particularly, when a marine vessel is a small-sized marine vessel, electric energy obtained by the solar power generation panel can be effectively used as a propelling force for the wind-propelled vessel.

The power module for use in a marine vessel is a self-contained power module for use in a marine vessel which includes a drive device and mechanisms necessary for operating the power module and hence, the connection with the outside is necessary only with respect to the supply of electricity and drainage of water. Accordingly, an amount of work necessary for installing the power module for use in a marine vessel on the marine vessel can be reduced.

A comprehensive control system is automatically operated and hence, attentions of crews are substantially unnecessary.

Hereinafter, some embodiments of the present invention are explained more specifically in conjunction with drawings.

Embodiment 1

Figure 2:
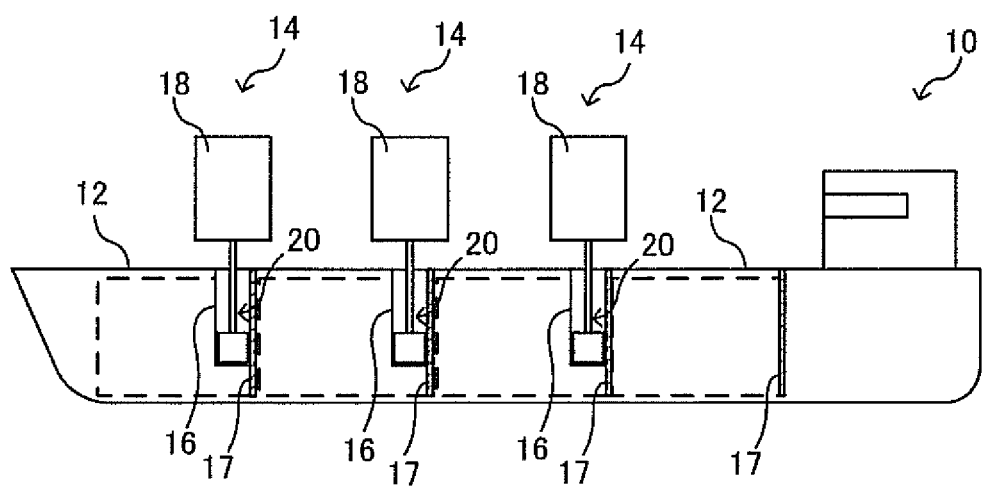
FIG. 2 is a schematic longitudinal cross-sectional view of the wind-propelled vessel.
Figure 3:
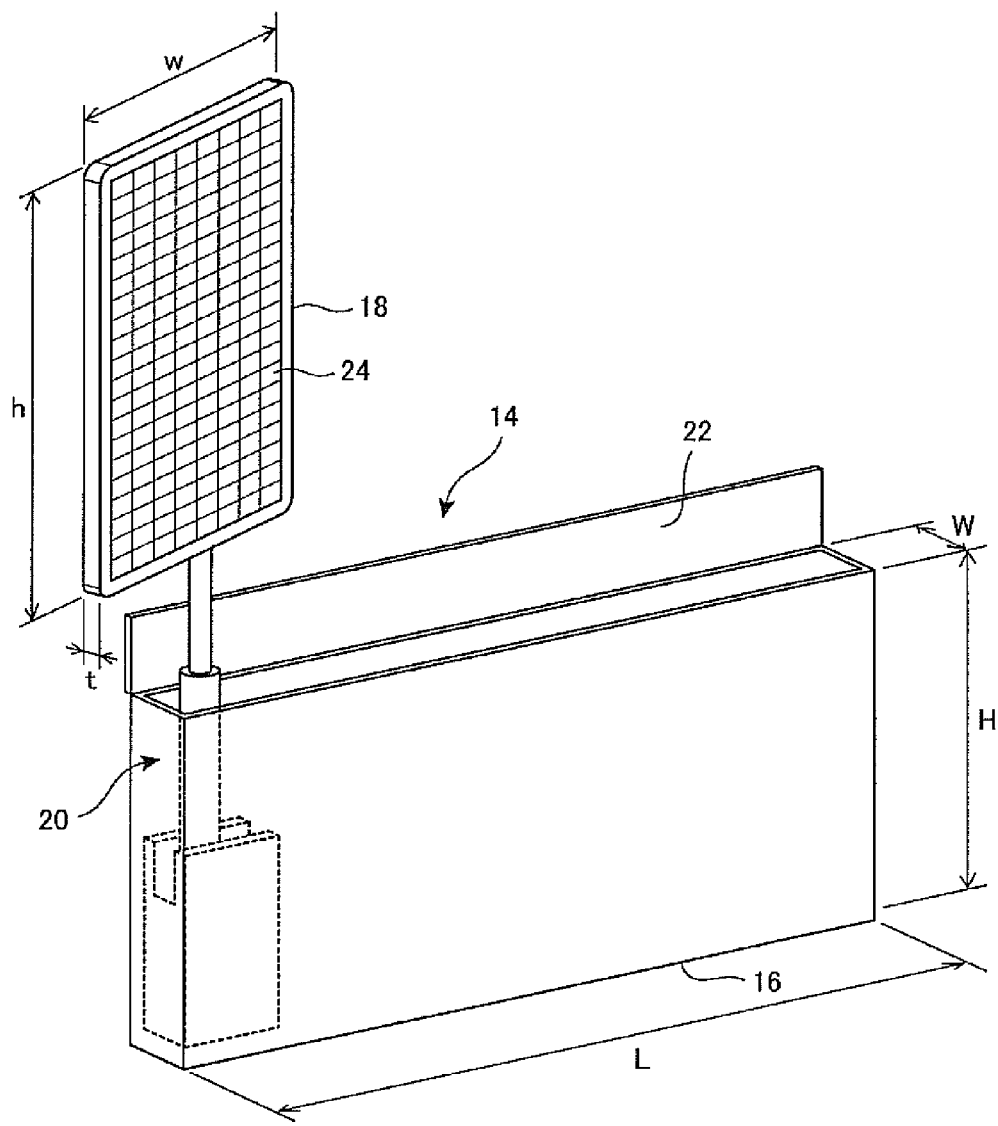
FIG. 3 is a perspective view of the power module for use in a marine vessel at a use position.
Figure 4:
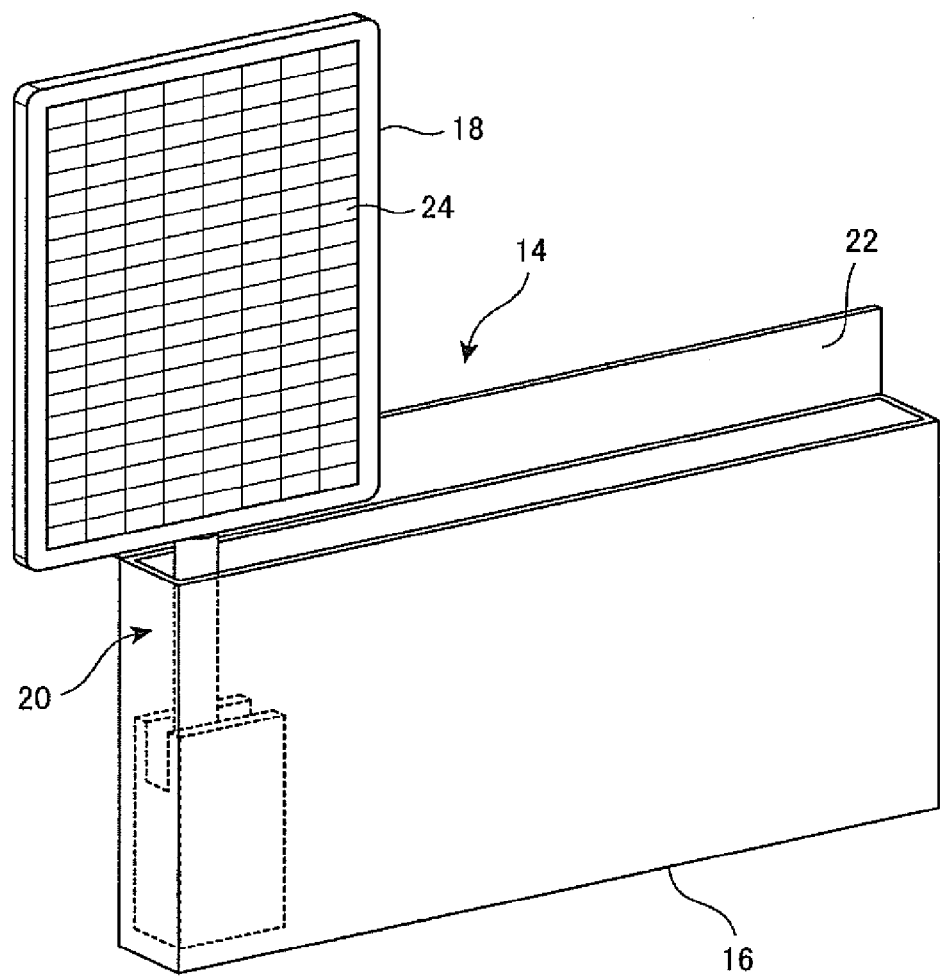
FIG. 4 is a perspective view of the power module for use in a marine vessel at an intermediate position between the use position and a storage position.
Figure 5:
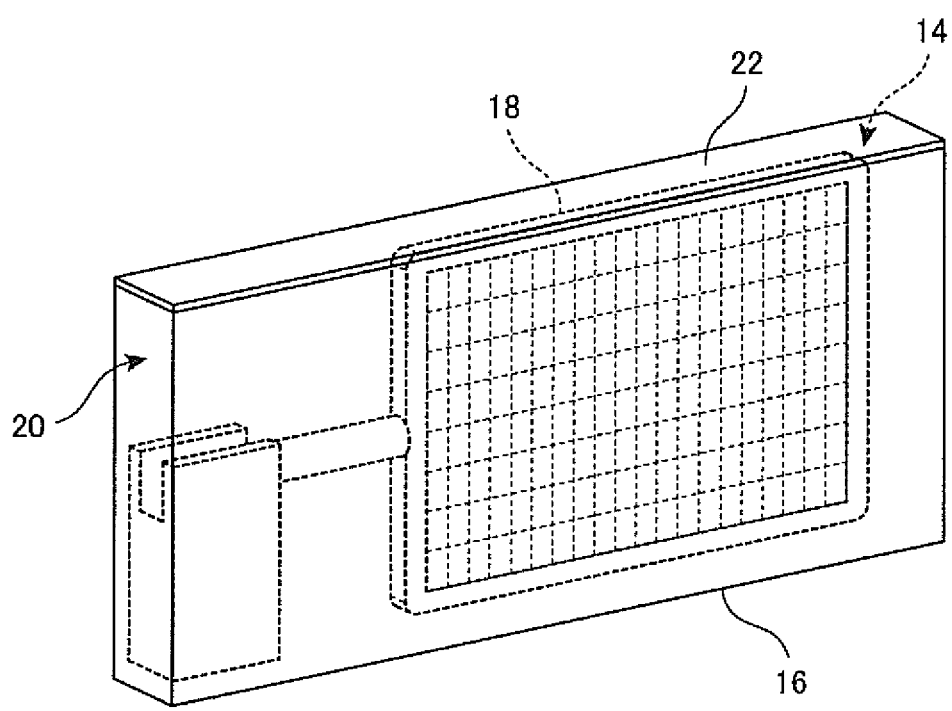
FIG. 5 is a perspective view of the power module for use in a marine vessel at the storage position.

FIG. 1 is a perspective view of a wind-propelled vessel on which a plurality of power modules for use in a marine vessel according to the embodiment 1 of the present invention are mounted, FIG. 2 is a schematic longitudinal cross-sectional view of the wind-propelled vessel, and FIG. 3 to FIG. 5 are perspective views of the power module for use in a marine vessel at the use position, the intermediate position and the storage position.

In FIG. 1 and FIG. 2, numeral 10 indicates a wind-propelled vessel (for example, a bulk carrier which is a type of large-sized marine vessel), and power modules for use in a marine vessel (hereinafter, referred to as "power module") 14 are mounted on a deck 12 of the wind-propelled vessel 10.

In this embodiment, as shown in the drawing, a plurality of small-sized power modules 14 having the approximately same shape are arranged on the vessel approximately uniformly in left and right symmetry with respect to a longitudinal axis of the wind-propelled vessel 10. Here, "the small-sized power module 14" means a power module having a length which is ⅓ or more and ½ or less of a total width of the wind-propelled vessel 10 at a center portion of the vessel 10.

Although the power module according to the present invention may be formed of a single large-sized power module, in this embodiment, the power module is constituted of a plurality of (for example, 14 in the drawing) small-sized power modules 14 (the small-sized power module also being referred to as the power module hereinafter) and hence, it is possible to obviate the instability of the wind-propelled vessel 10 generated when the single large power module is used. Further, by arranging the plurality of small-sized power modules 14 approximately uniformly in left and right symmetry with respect to the longitudinal axis of the wind-propelled vessel 10 which is a bulk carrier, the stability of the wind-propelled vessel 10 can be further enhanced.

However, the mounting number of power modules 14 is not always plural as shown in FIG. 1, and only one power module 14 may be used depending on a size of the wind-propelled vessel 10. Further, places where the power module 14 is mounted are not always limited to places shown in FIG. 1, and the power modules 14 may be mounted over the whole length of a hull or the power modules 14 may be mounted only a bow and a stern of the hull. Further, depending on a type of the wind-propelled vessel 10 on which the power modules 14 are mounted, the power modules 14 may be mounted on side surfaces of the vessel, on an upper surface of the vessel along the center line, or both on the side surfaces of the vessel and on the upper surface of the vessel along the center line.

Next, the constitution of each power module 14 is explained.

As shown in FIG. 2 to FIG. 5, the power module 14 includes a sail storage housing 16 which is preferably made of marine grade aluminum is arranged below a deck 12 of a wind-propelled marine vessel 10; a sail 18 which is movable between the storage position located inside the sail storage housing 16 and the use position at which the sail projects from the deck 12 in the vertical direction; and the sail movement unit 20 which is configured to move the sail 18 between the storage position and the use position.

In the above-mentioned constitution, firstly, the sail storage housing 16 is explained. The sail storage housing 16 is mounted on desired partition walls 17 out of a plurality of partition walls 17 which define a space formed in the vessel below the deck 12 into a plurality of holds (or cargo compartments). The partition walls 17 are provided as parts of structural materials for maintaining the strength of the hull. By mounting the sail storage housing 16 on the partition wall 17, the power module 14 can be effectively and firmly arranged below the deck 12 while suppressing the reduction of the hold space at a minimum level. The sail storage housing 16 is formed of a rectangular box body having a predetermined width W, a predetermined length L and a predetermined height H. A sail stowing space in which the sail 18 is stowed is formed in the inside of the sail storage housing 16. An opening is formed on an upper surface of the sail storage housing 16, and the sail 18 is stowed in the sail storage housing 16 through the opening. The opening can be opened or closed by an open/close lid or hatch 22 in a waterproof state thus providing the waterproof structure to the sail storage housing 16. Opening/closing of the open/close lid 22 is performed by a drive device such as a motor mounted on the deck 12, for example.

The sail storage housing 16 is arranged such that an upper surface of the sail storage housing 16 becomes substantially coplanar with the deck 12 as shown in FIG. 1 and FIG. 2. By arranging the sail storage housing 16 approximately coplanar with the deck 12, as described later, when the sail 18 is stowed in the sail storage housing 16, it is possible to prevent the sail 18 from projecting upward from the deck 12. However, it is sufficient that at least a portion of the sail storage housing 16 is arranged below the deck 12. For example, the upper portion of the sail storage housing 16 may slightly project from the deck 12. This is because, also in this case, it is possible to substantially prevent the sail 18 from being damaged by cargo or cargo-handling machinery when loading or unloading cargo. Further, both surfaces of the sail 18 are arranged such that both surfaces are movable on an imaginary vertical plane and hence, it is sufficient for the opening formed on the upper surface of the sail storage housing 16 to have an open area which allows an elongated rectangular end surface of the sail 18 to pass therethrough as shown in FIG. 3 to FIG. 6. Accordingly, it is possible to decrease the open area of the opening formed in a portion of the deck 12 corresponding to the opening formed on the upper surface of the sail storage housing 16 as much as possible.

Next, the explanation is made with respect to the constitution of the sail 18 which is movable between the horizontal storage position located inside the sail storage housing 16 and the vertical use position at which the sail projects from the deck 12 in the vertical direction.

As shown in FIG. 3 to FIG. 5, the sail 18 is formed of a hard rectangular flat plate having a predetermined thickness "t", a predetermined width "w" and a predetermined height "h". That is, the sail 18 is formed of a hard sail, and has a shape which allows the sail 18 to be stowed in a sail storage space of the sail storage housing 16. The sail 18 is also preferably made of marine-grade aluminum in view of weather resistance. With respect to a type of the sail 18, either a horizontal sail or a wing sail is preferably used. The sail 18 may be formed of a rectangular hollow flat plate.

The wind-propelled vessel 10 uses wind power obtained by the sail 18 as a propelling force for the wind-propelled vessel 10. In this embodiment 1, as shown in FIG. 1, the plurality of power modules 14 have the sail 18 respectively and hence, a large propelling force can be obtained by combining wind powers obtained by the respective sails 18.

Figure 7:
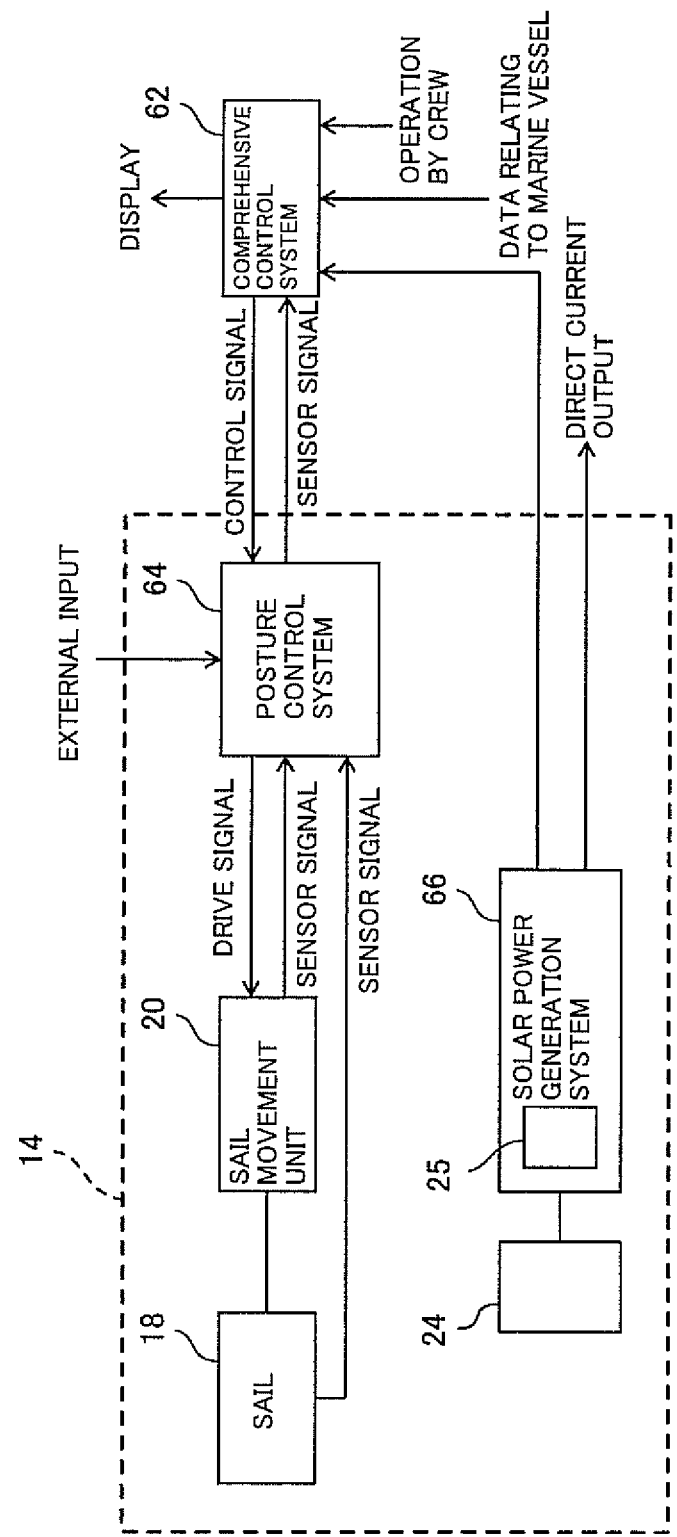
FIG. 7 is a block diagram showing the constitution of a posture control system of the power module for use in a marine vessel.

A large number of solar power generation panels 24 are laminated to both surfaces of the sail 18. Each solar power generation panel 24, as shown in FIG. 7, constitutes a part of a solar power generation system 66 which can convert solar energy into electric energy (direct current). Although electric energy (direct current) obtained by the solar power generation system 66 is used for operating systems (air conditioners and the like) and devices (lighting devices and the like) on the marine vessel, electric energy may be also used as a propelling force for the wind-propelled vessel in the same manner as wind power. In this case, the wind-propelled vessel can obtain a larger propelling force due to a propelling force obtained by a wind power and a propelling force obtained by the solar power generation panels 24. Particularly, when the wind-propelled vessel is a small-sized marine vessel, electric energy obtained by the solar power generation panels can be effectively used as a propelling force for the wind-propelled vessel.

Electric energy (direct current) obtained by the solar power generation system 66 can be stored in a battery 25 arranged in the inside of the solar power generation system 66. The stored electric energy is used for allowing the power module 14 to perform an operation of stowing the sail 18 in emergency such as the total power loss on the marine vessel, for example. Further, the stored electric energy is also effectively used when energy generated by wind power cannot be ensured as in the case where the marine vessel is anchored in a harbor.

Some of electric energy obtained by the solar power generation panels 24 may be supplied to a comprehensive control system 62, a posture control system 64 and the like described later.

Figure 6:
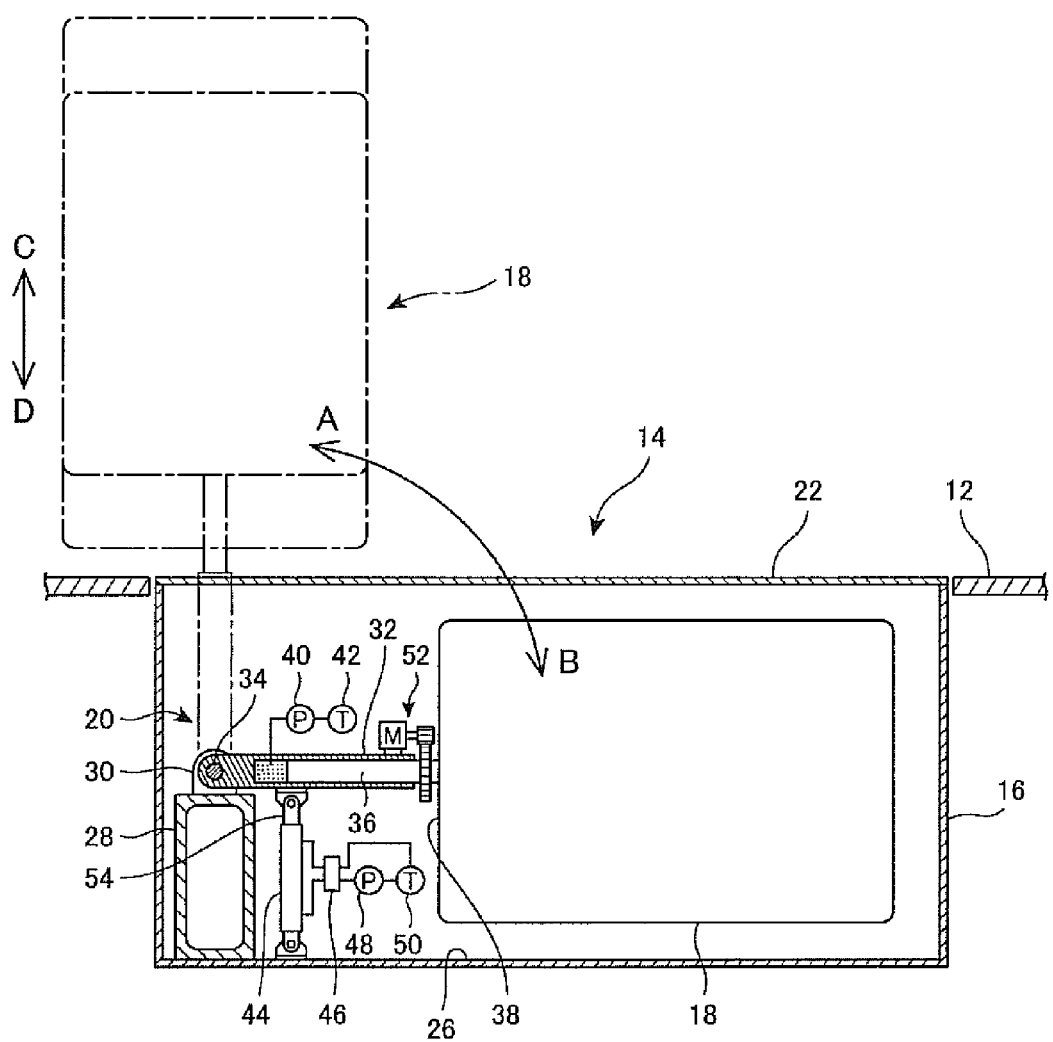
FIG. 6 is a perspective view showing the constitution of a sail movement unit of the power module for use in a marine vessel.

Next, the sail movement unit 20 which is configured to move the sail 18 between the storage position and the use position is explained in conjunction with FIG. 3 to FIG. 6, particularly in conjunction with FIG. 6.

As shown in FIG. 6, in this embodiment, the sail movement unit 20 is installed in the inside of a sail storage space of the sail storage housing 16, and has the following constitution. As shown in FIG. 7, in this embodiment, the sail movement unit 20 constitutes a part of the posture control system 64 described later, and the posture control system 64 is also preferably installed in the inside of the sail storage space of the sail storage housing 16.

A support base 28 is mounted on a bottom plate 26 of the sail storage housing 16. A proximal end portion of a sail extending and retracting cylinder 32 which constitutes a sail extending and retracting device is rotatably and pivotally mounted on an upper surface of the support base 28 about a pivot shaft 34 by means of a bearing device 30. A proximal end portion 38 of the sail 18 is fixedly mounted on a distal end of an extending and retracting rod 36 of the sail extending and retracting cylinder 32 which constitutes a sail extending and retracting device. A hydraulic pump 40 and a tank 42 are connected to an oil chamber defined in the sail extending and retracting cylinder 32. A sail raising and lowering cylinder 44 which includes a raising-and-lowering-use extending and retracting rod 54 is interposed between a side surface of a proximal portion of the sail extending and retracting cylinder 32 and the bottom plate 26 of the sail storage housing 16. The sail raising and lowering cylinder 44 is connected to a hydraulic pump 48 and a hydraulic tank 50 by way of a directional control valve 46. A sail rotating device 52 is mounted on a distal end side of the sail extending and retracting cylinder 32. The sail rotating device 52 can rotate the extending and retracting rod 36 about a longitudinal axis of the extending and retracting rod 36 and also rotates the sail 18 together with the extending and retracting rod 36.

Due to the above-mentioned constitution, when the raising-and-lowering-use extending and retracting rod 54 is extended by operating the sail raising and lowering cylinder 44, the sail extending and retracting cylinder 32 is rotated in the direction A about a pivot shaft 34 so that the sail extending and retracting cylinder 32 is raised. Along with the raising of the sail extending and retracting cylinder 32 by rotation, the sail 18 at the horizontal storage position (the position indicated by a solid line) where the top of the sail 18 is completely covered with the open/close lid 22 is integrally raised by rotation by 90 degrees and takes a vertical position (intermediate position). Then, when the extending and retracting rod 36 is extended in the direction C by operating the sail extending and retracting cylinder 32, the sail 18 takes the vertical use position.

When the extending and retracting rod 36 is retracted in the direction D by operating the sail extending and retracting cylinder 32 opposite to the above-mentioned manner of operation, the sail 18 is lowered to the intermediate position. Then, when the raising-and-lowering-use extending and retracting rod 54 is retracted by operating the sail raising and lowering cylinder 44, the sail extending and retracting cylinder 32 falls by being rotated in the direction B about the pivot shaft 34 so that the sail 18 takes the storage position.

Next, a control system which controls a posture of the sail 18 at the use position based on a wind speed, a wind direction, information on the marine vessel and the like is explained in conjunction with FIG. 7.

In FIG. 7, the comprehensive control system 62 controls all power modules 14 in a comprehensive manner. To be more specific, the comprehensive control system 62 performs a posture control of the sail 18 byway of a posture control system 64 provided for every power module 14.

That is, sensor signals relating to a wind speed, a wind direction and positional information on the sail 18 which are obtained by various sensors mounted on the sail 18 are inputted to the comprehensive control system 62 in which a CPU is incorporated by way of the posture control system 64. Data (power output and the like) relating to power generation which is supplied from the solar power generation system 66 for converting solar energy into a direct current is inputted to the comprehensive control system 62 in the same manner. Further, data relating to the marine vessel (for example, pitching and rolling of the marine vessel, a speed of the marine vessel, the bow direction) and an operation signal generated by a crew are also inputted to the comprehensive control system 62. The comprehensive control system 62 calculates a posture of the sail 18 necessary for effectively and fully making use of wind based on these input signals and, based on a calculation result, outputs control signals to the posture control system 64 of the power module 14 in which the CPU is incorporated. Each posture control system 64 controls a posture of the sail 18 by outputting a drive signal to the sail movement unit 20 based on the control signal thus performing a posture control of the sail 18. That is, the plurality of power modules 14 can be controlled using the single comprehensive control system 62 so that it is unnecessary for a crew to individually perform a management operation of each sail 18 or each power module 14.

A display device not shown in the drawing is connected to the comprehensive control system 62. A crew can recognize posture control states and the power generation states of all power modules 14 through a display screen of the display device. In emergency, the posture control system 64 may control a posture of the sail 18 by driving the sail movement unit 20 based on an input obtained from the outside or an input obtained by a local control panel independent from a control signal from the comprehensive control system 62. At the time of entering a harbor or departing from the harbor, a crew can raise or lower the sail 18 manually. The comprehensive control system 62 can be installed on a bridge or other places of the marine vessel remote from the above-mentioned power module 14.

Most of electric energy obtained by the solar power generation panel 24 is used as a part of propelling force for the wind-propelled vessel 10. However, some of electric energy is supplied also to the comprehensive control system 62, the posture control system 64 and other systems (air conditioning systems and the like) and other devices (lighting devices and the like).

Hereinafter, the manner of operation of the power module 14 according to the embodiment 1 is explained.

In a use state, as shown in FIG. 1 and FIG. 2, in all power modules 14, each sail 18 is in a vertically extended state. By combining wind powers obtained by the respective sails 18, the wind-propelled vessel 10 can obtain a strong propelling force. Further, electric energy obtained by the solar power generation panels 24 can be used as a propelling force for the wind-propelled vessel 10 in the same manner as the wind power. Accordingly, the wind-propelled vessel 10 can obtain a stronger propelling force due to the propelling force obtained by wind power and a propelling force obtained by the solar power generation panels 24.

Further, the power module 14 according to this embodiment includes the posture control system 64. Accordingly, the posture of the sail 18 can be controlled by rotating the sail 18 (for example, by rotating the sail 18 toward a left wing and a right wing by 90 degrees) or raising or lowering the sail 18 in accordance with a state of wind (wind speed, wind direction or the like). That is, the posture of the sail 18 can be controlled in accordance with a state of wind which changes every moment and hence, wind power and solar power can be always utilized optimally.

Although the sail 18 per se cannot generate a propelling force when there is no wind, the solar power generation panels 24 mounted on the sail 18 can generate energy used as a propelling force for the marine vessel.

On the other hand, when the marine vessel vigorously rolls or pitches in the strong wind, the sail 18 may not be used. In such a case, the sail movement unit 20 is driven by operating the posture control system 64. That is, the sail 18 is retracted from the use position shown in FIG. 3 to the intermediate position shown in FIG. 4 and, thereafter, the sail 18 is lowered to the storage position shown in FIG. 5 from the intermediate position so that the sail 18 can be stowed in the sail storage housing 16. The sail storage housing 16 has the waterproof structure and hence, the weather resistance of the power module 14 can be enhanced.

As has been explained above, in the embodiment 1, the power module 14 is characterized by including: the sail storage housing 16 which has at least a portion thereof arranged below the deck 12 of the marine vessel; the sail 18 which is movable between the storage position located inside the sail storage housing 16 and the use position at which the sail 18 projects from the deck 12 in the vertical direction; and the sail movement unit 20 which is configured to move the sail 18 between the storage position and the use position.

However, the present invention is not limited to the above-mentioned embodiment at all, and various modifications and variations are conceivable.

Figure 8:
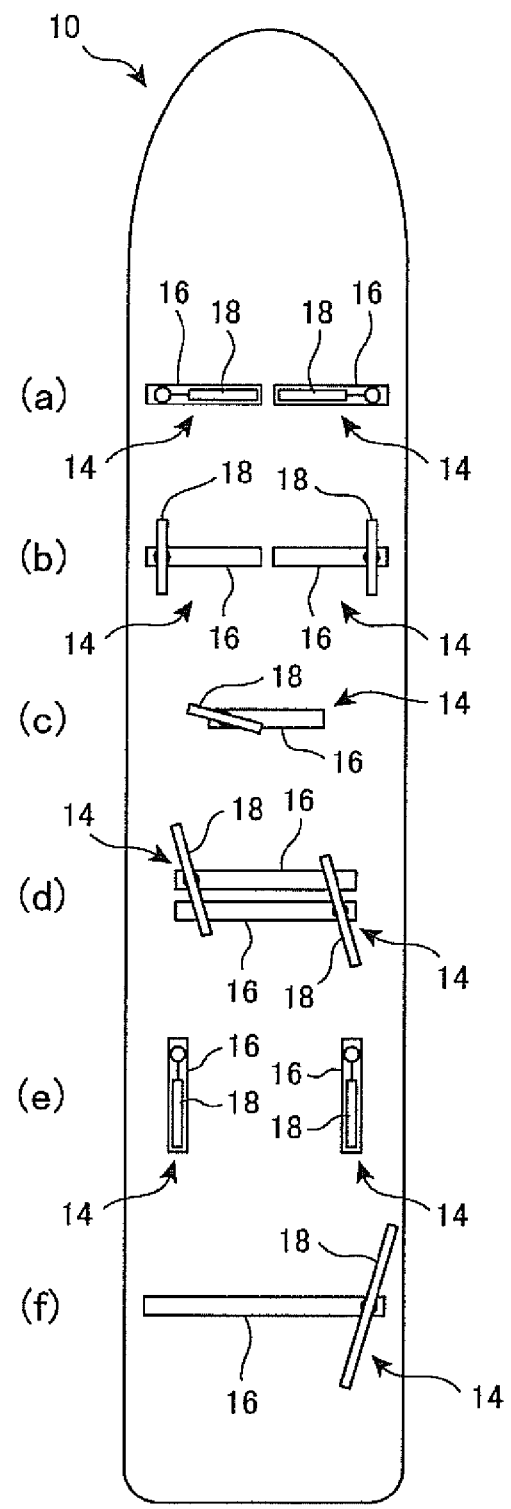
FIG. 8 is an explanatory view showing various mounting states of the power module for use in a marine vessel.

For example, in the above-mentioned embodiment, the explanation has been made with respect to the example where, as shown in FIG. 1 and FIG. 8(*a*), (*b*), on the deck 12 of the wind-propelled vessel 10, two power modules 14 having the sail respectively are arranged in series in the direction perpendicular to the longitudinal direction of the wind-propelled vessel 10 (the width direction of the wind-propelled vessel 10). FIG. 8(*a*) shows the storage state of the power module 14, and FIG. 8(*b*) shows the use state of the power module 14.

However, the power modules 14 may be arranged as shown in FIG. 8 (*c*) to FIG. 8 (*f*). To be more specific, FIG. 8 (*c*) shows an example where one sail storage housing 16 is arranged at the center in the width direction of the marine vessel, and the sail 18 is stowed in a state where the sail 18 is movable in the width direction. FIG. 8(*d*) shows an example where the sail storage housings 16 having a size larger than the sail storage housing 16 shown in FIG. 1, FIG. 8 (*a*) and FIG. 8 (*b*) (having a width larger than ½ of a width of a hull) are arranged parallel to each other in the longitudinal direction of the wind-propelled vessel 10, and the sail 18 is stowed in each sail storage housing 16 in a state where the sail 18 is movable in the width direction. In the mode shown in FIG. 8(*d*), the power module 14 arranged on a front side of the hull is arranged closer to a left wing side with respect to the center of the hull when the sail 18 is raised, and the power module 14 arranged on a rear side of the hull is arranged closer to a right wing side with respect to the center of the hull when the sail 18 is raised. That is, when the sails 18 are raised in the respective power modules 14 arranged parallel to each other, a shaft portion of each sail 18 (also referred to as a sail shaft portion hereinafter) is arranged alternately between a left wing side and a right wing side. Accordingly, the sails 18 are made to partially overlap with each other with respect to the wind direction while decreasing the interference between the sails 18 thus making the sail 18 receive wind efficiently. FIG. 8(*e*) shows a case where the sail storage housing 16 is arranged along left and right side edges of the wind-propelled vessel 10, and the sail 18 is storable in the respective sail storage housing 16. FIG. 8 (*f*) shows an example where the sail storage housing 16 larger than the sail storage housing 16 shown in FIG. 8(*c*) is arranged over the whole width of the vessel in the same direction as the sail storage housing 16 shown in FIG. 8(*c*), and the sail 18 is stowed in the sail storage housing 16 in a state where the sail 18 is movable in the width direction.

Figure 9:
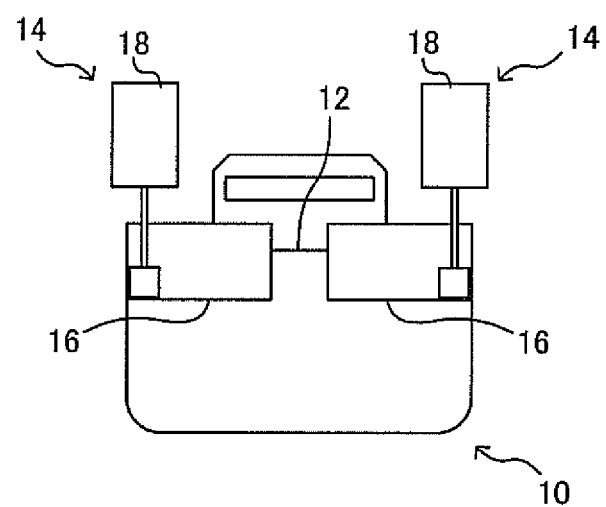
FIG. 9 is an explanatory view showing a modification of the power module for use in a marine vessel according to the embodiment 1.

FIG. 9 shows a modification of the power module 14 according to the embodiment 1. As shown in the drawing, the power modules 14 are partially stowed in the deck 12. In this case, the reduction of the cargo storage space in a hold space can be suppressed.

The following modifications are also considered with respect to the embodiment 1.

(1) By setting the sail in an extended state in a use time lower than a bridge (or by arranging the sail behind the bridge), it is possible to prevent a field of view of a crew from the bridge from being interrupted by the sail.

(2) For securing safety of a crew, the sail 18 may be extended only when an encrypted command is inputted into the comprehensive control system by the crew.

(3) A central key may be used for making the whole comprehensive control system 62 usable or non-usable. This key may be removed for preventing an extending operation of the sail 18 when the marine vessel enters a harbor, for example.

(4) The constitution where the sail movement unit 20 uses the hydraulic cylinder as a drive actuator is exemplified. However, it is needless to say that other actuators or means are applicable as the drive actuator.

(5) The power modules 14 can be mounted on various existing marine vessels or newly constructed marine vessels.

(6) When solar panels having more effective photoelectric conversion efficiency become available, such solar panels may be mounted on the sail or the sail can be exchanged or updated with different kind of sail.

(7) The power module 14 according to the embodiment 1 forms a module. Accordingly, the mode and the size of the power module 14 can be flexibly adjusted corresponding to the size of the wind-propelled vessel 10. To be more specific, corresponding to the size of the wind-propelled vessel 10, the power module 14 can adjust the size of the sail or the area of the sail, and can adjust the extension height of the sail above the deck. The power module 14 may be stowed vertically in the sail storage housing 16.

(8) Although the solar power generation system 66 may be arranged at anyplace in the power module 14 such as in the inside of the sail storage housing 16, the solar power generation system 66 may be also directly fitted to the sail 18.

Embodiment 2

Next, a power module according to the embodiment 2 is explained. In the embodiment 2 which is explained hereinafter and in the embodiments 3, 4 explained after the explanation of the embodiment 2, in the drawings referenced by these embodiments, for the sake of convenience of explanation, apart corresponding to the open/close lid 22 and apart corresponding to the solar power generation panel 24 may be omitted from the drawings. It is needless to say, however, that these constitutions are applicable to any one of these embodiments.

The power module according to the embodiment 2 is characterized in that a mechanism which tilts the sail is added to the above-mentioned constitution of the power module according to the embodiment 1 described above.

That is, as shown in FIG. 10A to FIG. 10D, a power module 114 includes: a sail storage housing 116 which has at least a portion thereof arranged below a deck of a marine vessel; a sail 118 which is raised or lowered between the horizontal storage position located inside the sail storage housing 116 and the vertical use position at which the sail 118 projects from the deck in the vertical direction; and a sail movement unit 112 which is configured to raise or lower the sail 118 between the storage position and the use position, to extend the sail 118, to rotate the sail 118 about an axis of the sail 118, and to tilt the sail 118 between a vertical plane and a horizontal plane above a deck of a vessel.

The constitution of the above-mentioned sail movement unit 112 is specifically explained hereinafter. A fixed base 109 is installed in the inside of the sail storage housing 116. A first rod 111 which has a proximal end thereof pivotally mounted on the fixed base 109 is tiltable by a first rotary motor 113. A proximal end of a second rod 115 is connected to a distal end of the first rod 111 by way of a second rotary motor 160 which constitutes a sail tilting device capable of tilting the sail 118 at a desired angle position between a vertical plane and a horizontal plane. A proximal end of an extensible and retractable third rod 117 where a proximal portion of the sail 118 is mounted on a distal end of the third rod 117 is connected to a distal end of the second rod 115 by way of a third rotary motor 152 which constitutes a sail rotary device which rotates the third rod 117 about an axis of the third rod 117.

Figure 10A:
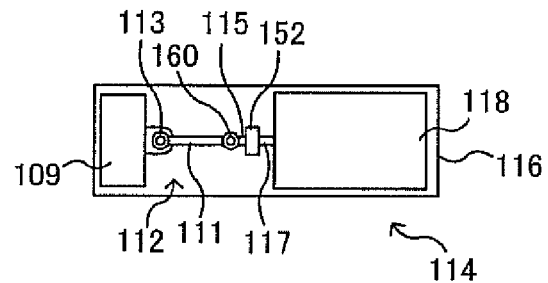
FIG. 10A is a schematic explanatory view showing the constitution of a power module for use in a marine vessel according to an embodiment 2 of the present invention.
Figure 10B:
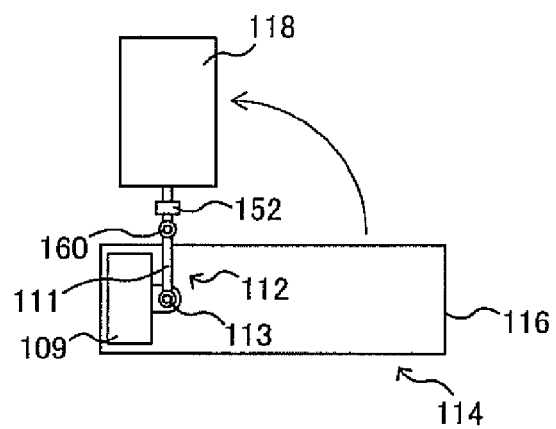
FIG. 10B is a schematic explanatory view showing the constitution and the manner of operation of the power module for use in a marine vessel according to the embodiment 2 of the present invention.
Figure 10C:
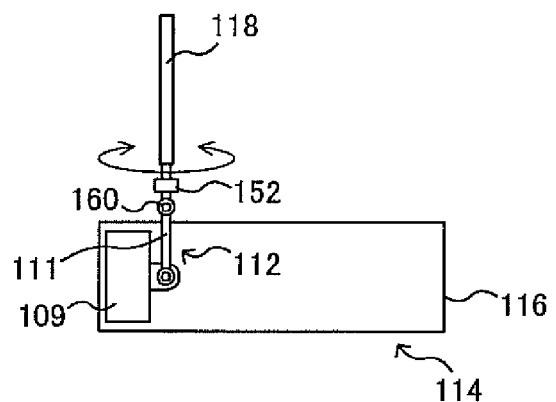
FIG. 10C is a schematic explanatory view showing the constitution and the manner of operation of the power module for use in a marine vessel according to the embodiment 2 of the present invention.
Figure 10D:
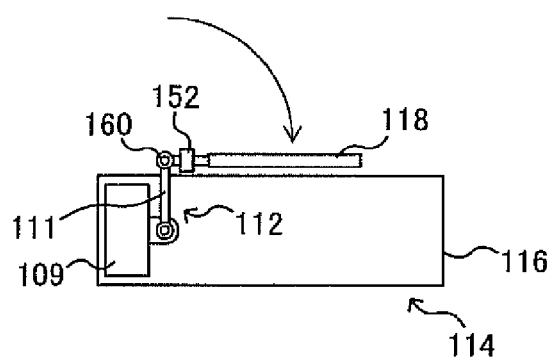
FIG. 10D is a schematic explanatory view showing the constitution and the manner of operation of the power module for use in a marine vessel according to the embodiment 2 of the present invention.

With the use of the sail movement unit 112 described above, as shown in FIG. 10A to FIG. 10D, when the first rotary motor 113 is driven, the sail 118 which is stored in the sail storage housing 116 in a horizontal posture at the storage position shown in FIG. 10A below a deck is integrally rotated and raised by 90 degrees and the third rod 117 can be extended so that the sail 18 takes a vertical use position (FIG. 10B). Then, the sail 118 can be rotated about an axis thereof by driving the third rotary motor 152 (FIG. 10C), and the sail 118 can be tilted at any desired tilting angle such as 30 degrees or 60 degrees between a vertical plane and a horizontal plane or a surface of the deck by driving the second rotary motor 160 (FIG. 10D). Accordingly, the sail 118 can be rotated and tilted such that the sail 118 follows the moving trajectory of the sun and hence, solar energy can be fully utilized, and wind power which the sail 118 receives can be also adjusted.

When a wind-propelled vessel is anchored in a harbor or the like, the sail 118 is moved from the horizontal storage position to the vertical use position and, then, the sail 118 is rotated about the axis thereof by 90 degrees. Thereafter, the second rotary motor 160 which constitutes the sail tilting device is driven so as to tilt one surface of the sail 118 to a completely horizontal state. Accordingly, the sail 118 can be placed horizontally above a deck of the vessel in a state that the whole other surface of the sail 118 faces upward. Accordingly, the sail 118 is made to function purely as a solar panel. The sail 118 does not become an obstacle at such a position and hence, it is almost unnecessary for the crew of the vessel to control the sail 118. Further, by placing the sail 118 horizontally on the deck of the vessel in a state where the sail 118 is brought into a completely horizontal state, the repair and the maintenance of the sail 118 can be easily performed. Still further, when the sail 118 assumes the horizontal position above the deck, this position is available as another storage position of the sail 118 besides the storage position which the sail 118 assumes in the sail storage housing 116 below the deck. This storage position is advantageous when the good weather continues for a long period of time so that it is not so necessary to store the sail 118 in the sail storage housing 116. That is, according to the embodiment 2, the sail 118 can take two storage positions consisting of the storage position below the deck and the storage position above the deck.

FIG. 11A to FIG. 11E show sail movement units 162 according to modifications of the above-mentioned sail movement unit 112.

Figure 11A:
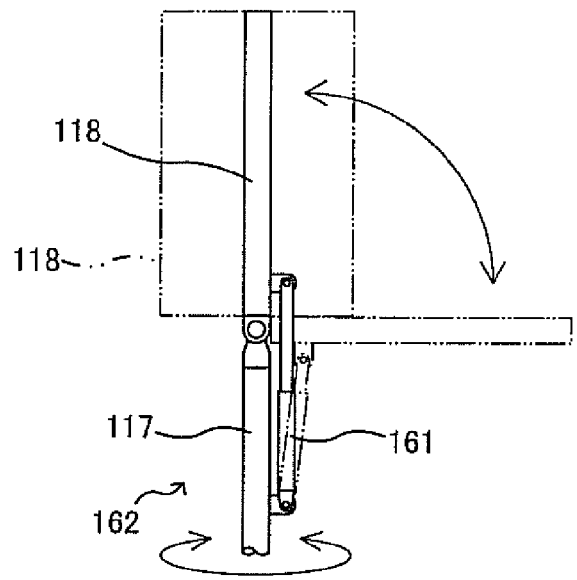
FIG. 11A is a schematic explanatory view showing the constitution and the manner of operation of a power module for use in a marine vessel according to a modification of the embodiment 2 of the present invention.

The modification shown in FIG. 11A is characterized in that an extending and retracting cylinder 161 is used in place of the second rotary motor 160 which constitutes the sail tilting device capable of tilting the sail 118 between a vertical plane and a horizontal plane. In this modification, the sail 118 is rotated by rotating a third rod 117 about an axis of the third rod 117 by a sail rotation device not shown in the drawing.

Figure 11B:
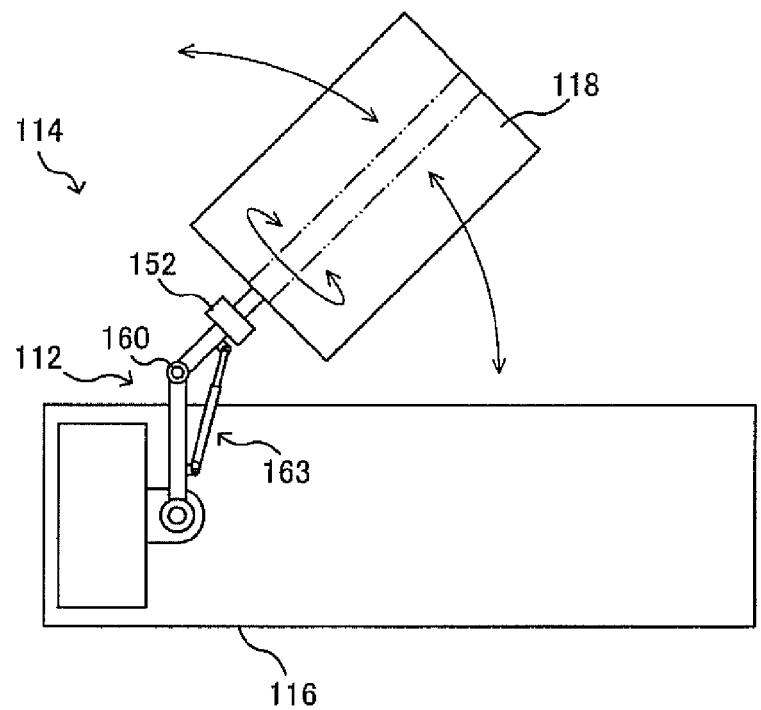
FIG. 11B is a schematic explanatory view showing the constitution and the manner of operation of a power module for use in a marine vessel according to a modification of the embodiment 2 of the present invention.

The modification shown in FIG. 11B is characterized in that an extending and retracting cylinder 163 is used in place of the first rotary motor 113 capable of tilting the first rod 111 shown in FIG. 10A to FIG. 10D.

Figure 11C:
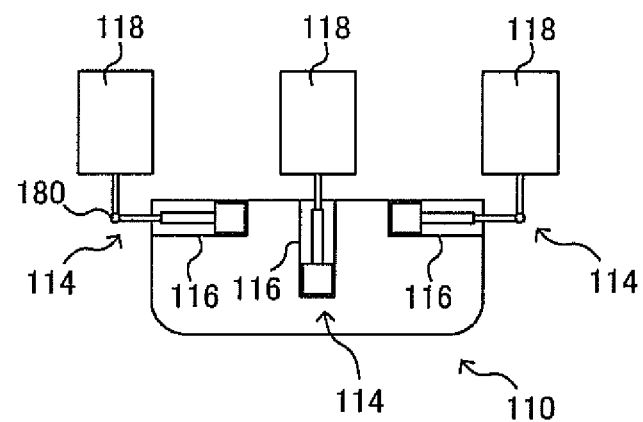
FIG. 11C is a schematic explanatory view showing the constitution of a power module for use in a marine vessel according to a modification of the embodiment 2 of the present invention.

The modification shown in FIG. 11C is characterized in that a sail 118 is taken out to the outside by moving the sail 118 using a hydraulic cylinder in the horizontal direction from the sail storage housings 116 having at least a portion thereof arranged below a deck of a marine vessel through openings formed on upper portions of both side walls of the marine vessel and, thereafter, the sail 118 is raised or lowered between the vertical direction and the horizontal direction by a rotary motor 180 which constitutes a sail tilting device. Due to such a constitution, a space which a power module 114 occupies in the vertical direction in a hull can be suppressed. In this modification, the power module 114 may be provided also at the center of the hull when necessary.

Figure 11D:
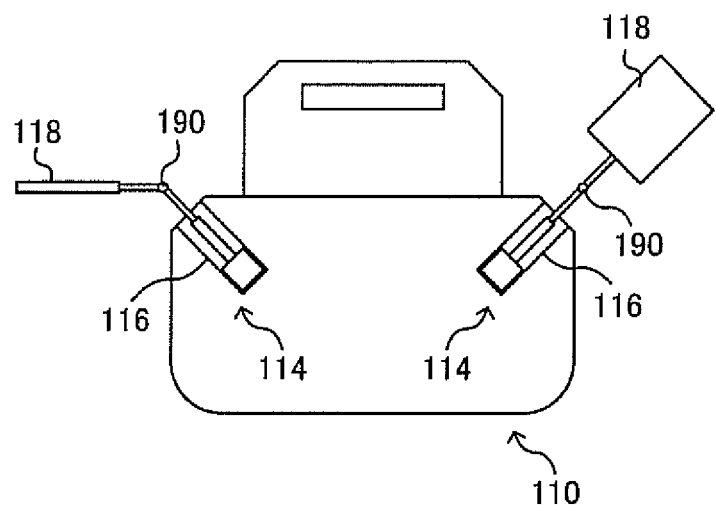
FIG. 11D is a schematic explanatory view showing the constitution of a power module for use in a marine vessel according to a modification of the embodiment 2 of the present invention.

The modification shown in FIG. 11D is characterized in that sails 118 which are stowed in the sail storage housings 116 respectively in an inclined state are taken out to the outside by moving the sails 118 using a hydraulic cylinder in the horizontal direction from the sail storage housings 116 having at least a portion thereof arranged below a deck of a marine vessel through inclined openings formed on upper portions of both side walls of the marine vessel and, thereafter, the sails 118 are raised or lowered between the vertical direction and the horizontal direction by a rotary motor 190 which constitutes a sail tilting device. Due to such a constitution, a space which a power module 114 occupies in a hull can be suppressed.

Figure 11E:
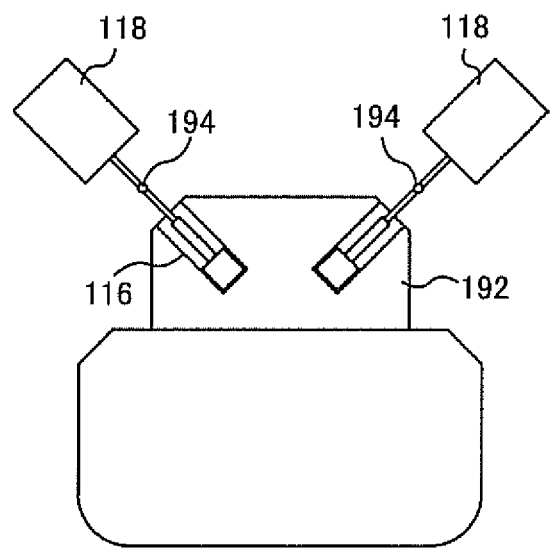
FIG. 11E is a schematic explanatory view showing the constitution of a power module for use in a marine vessel according to a modification of the embodiment 2 of the present invention.

The modification shown in FIG. 11E is characterized in that sails 118 which are stowed in the sail storage housings 116 respectively in an inclined state are taken out to the outside by moving the sails 118 using a hydraulic cylinder in the horizontal direction through inclined openings formed on both side walls of an upper structural body 192 arranged on a deck of a marine vessel and, thereafter, the sails 118 are raised or lowered between the vertical direction and the horizontal direction by a rotary motor 194 which constitutes a sail tilting device. Due to such a constitution, a space which a power module 114 occupies in a hull can be suppressed.

Figure 12:
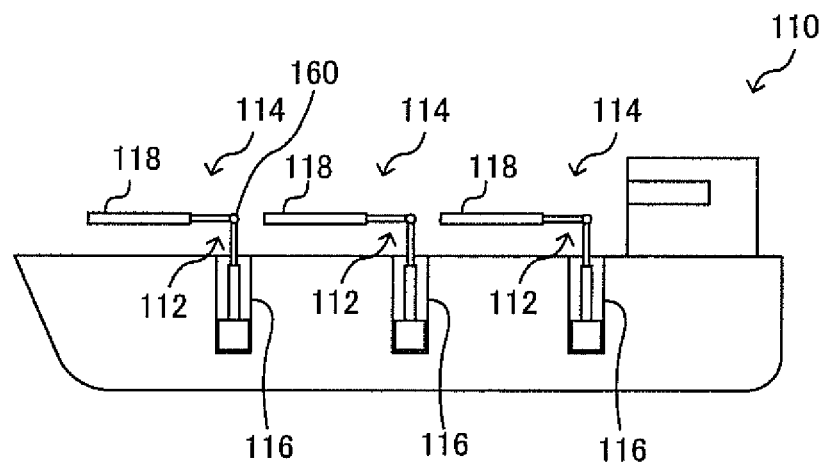
FIG. 12 is a perspective view of a wind-propelled vessel on which a plurality of power modules for a marine vessel according to the embodiment 2 are mounted.

FIG. 12 is a schematic view of a wind-propelled vessel 110 on which the power modules 114 according to the embodiment 2 are mounted.

Embodiment 3

A power module according to the embodiment 3 is characterized in that sail storage housings are mounted on and along an outer surface or an inner surface of an outer wall of a hull at a position below a deck of a marine vessel.

Figure 13:
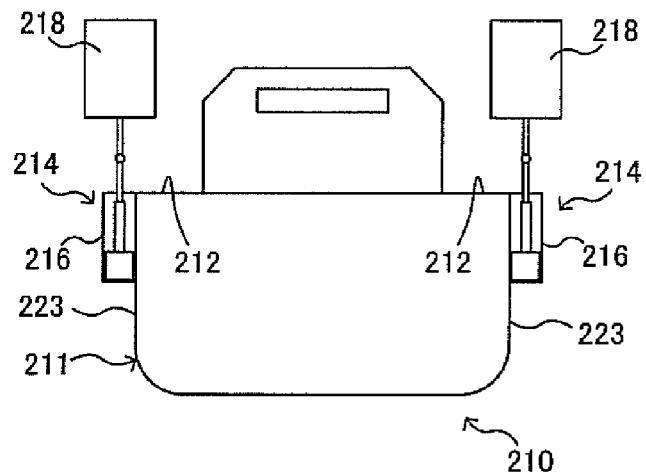
FIG. 13 is a schematic explanatory view showing the constitution of a power module for use in a marine vessel according to an embodiment 3 of the present invention.

That is, as shown in FIG. 13, a sail storage housing 216 of a power module 214 is mounted on outer surfaces of both side walls 223 of a hull 211 of a wind-propelled vessel 210, and a mounting position of the power module 214 is positioned below the deck 212 of the marine vessel.

According to this embodiment, by fully extending a sail thus fully making the effective use of wind power when the marine vessel is propelled, a use amount of fuel can be further reduced thus preventing air pollution.

Further, the sail 218 can be substantially stowed in the sail storage housing 216 below the deck 212 when the marine vessel is not propelled. Accordingly, when loading or unloading cargo, cargo can be loaded on or unloaded from the marine vessel without being obstructed by the sail 218 and, further, it is possible to completely prevent cargo or cargo-handling machinery from damaging the sail 218.

Figure 14:
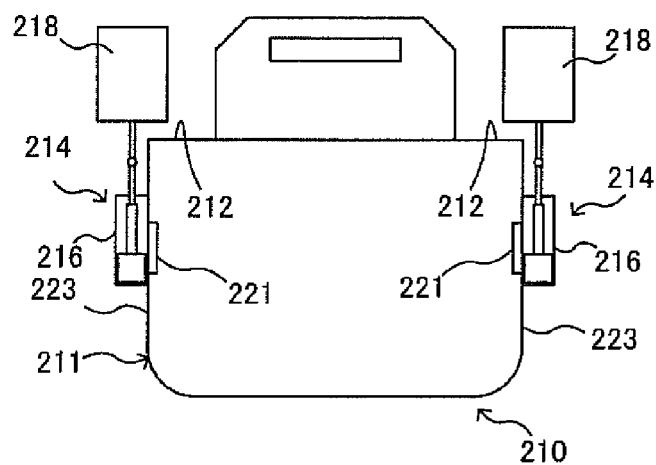
FIG. 14 is a schematic explanatory view showing the constitution of a power module for use in a marine vessel according to a modification of the embodiment 3 of the present invention.
Figure 15:
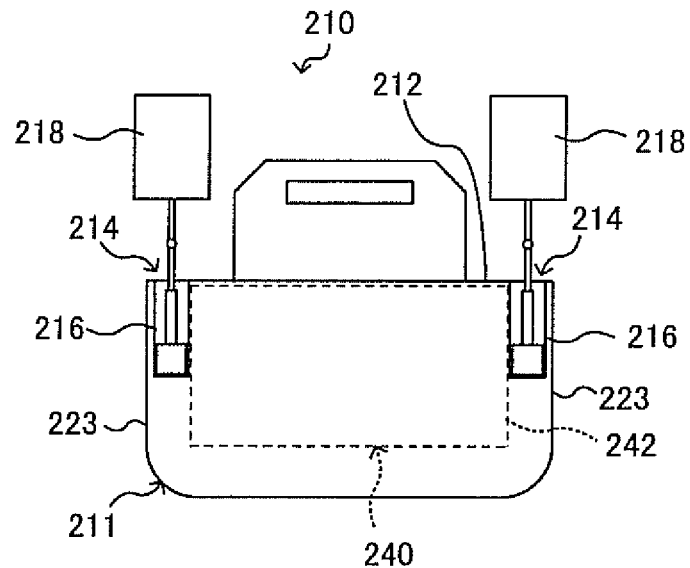
FIG. 15 is a schematic explanatory view showing the constitution of a power module for use in a marine vessel according to a modification of the embodiment 3 of the present invention.
Figure 16:
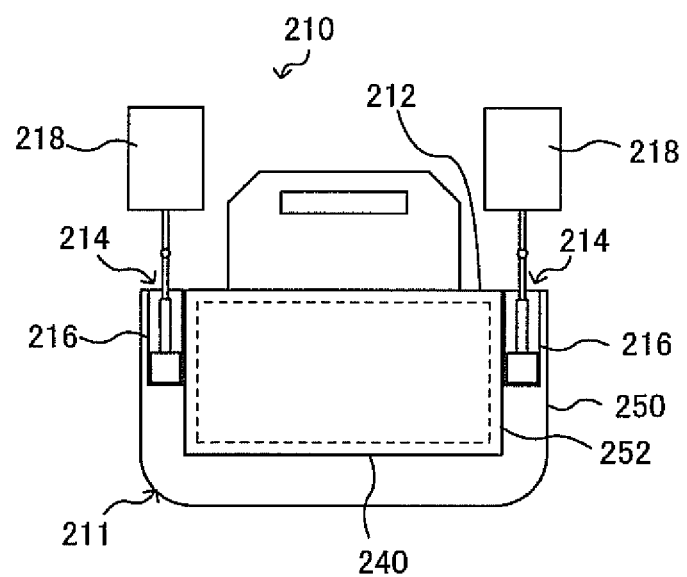
FIG. 16 is a schematic explanatory view showing the constitution of a power module for use in a marine vessel according to a modification of the embodiment 3 of the present invention.

FIG. 14 to FIG. 16 show modifications of a power module 214 according to the embodiment 3.

The modification shown in FIG. 14 is characterized in that a repair-use door 221 which makes the inside of the power module 214 and the inside of a hold communicate with each other is formed on an inner surface of a side wall 223. Due to such a constitution, an operator can easily perform the internal inspection and repair of the power module 214.

The modification shown in FIG. 15 is characterized in that a sail storage housing 216 of a power module 214 is mounted on an outer surface of a side wall 242 of a cargo chamber 240 positioned on inner surface side of both side walls 223 of a hull 211 of a wind-propelled vessel 210. In this case, narrowing of an inner space of the cargo chamber 290 by the power module 214 can be prevented as much as possible, and also it is possible to protect the power module 214 from wind and rain.

The modification shown in FIG. 16 is characterized in that a sail storage housing 216 of a power module 214 is mounted on an outer surface of an inner wall 252 out of a side wall having the duplicate wall structure (outer wall 250 and inner wall 252) of a hull 211 of a wind-propelled vessel 210. The sail storage housing 216 of the power module 214 may be also mounted on an inner surface of the outer wall 250. Also in this case, in the same manner as the modification shown in FIG. 15, narrowing of the inner space of a cargo chamber 240 by the power module 214 can be prevented, and it is possible to protect the power module 214 from wind and rain.

Embodiment 4

A power module according to the embodiment 4 is characterized in that a sail 318 can be directly moved in the vertical direction (lifted up and down).

Figure 17:
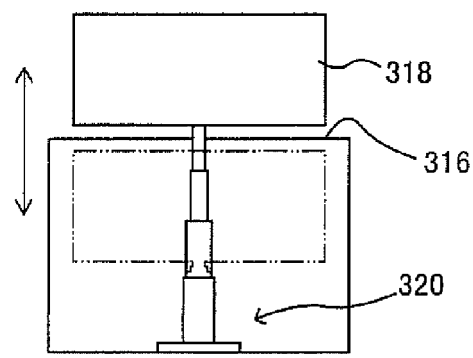
FIG. 17 is a schematic explanatory view showing the constitution of a power module for use in a marine vessel according to an embodiment 4 of the present invention.

That is, as shown in FIG. 17, a lifting mechanism 320 constituted of multi-stage telescopic lifting cylinders is installed as a sail movement unit below a deck 316 of a marine vessel and directly below a sail 318. By constituting the sail movement unit using the multi-stage telescopic lifting cylinders, the sail movement unit has the simple structure and hence, the inspection and the repair of the power module are facilitated.

To recapitulate the advantages brought about by the constitutional features of the above-mentioned embodiments according to the present invention, they are as follows.

(1) The module provides a means to stow the sail below or above the deck. This ensures that the sail is protected from damage during loading and unloading and does not present a risk to the ship or crew during storms. This also means the sail can be stowed away during emergencies when helicopters may be needed to evacuate the ship's crew, for example.

(2) The divided sails are basically small-sized and hence, the divided sails are lightweight in nature thus reducing stability issues when raised. In addition, when the module is mounted below the deck, its weight acts to counteract the weight of the raised sail thus keeping the overall center of gravity low. This further improves stability.

(3) The module can be installed in a variety of positions such as on the outside of the hull, horizontally on the deck or below the deck on a ship.

(4) Since the sail is stowed below deck, it does not interfere with loading or unloading operations of the ship.

(5) The sail can gather energy from the wind and sun. When no wind is blowing, the sail can be positioned in such a way as not to create drag but to act still as a solar energy collector.

(6) The raised sail can be lowered than the ships bridge (or can be located behind the bridge) and therefore it will not obstruct the crew's view from the bridge.

(7) The modular design of the system overcomes the stability problems faced by large rigid sail solutions. This is because a large sail is broken up (divided) into small-sized sails and the divided small-sized sails are located on the ship in locations that help overcome stability concerns.

(8) The module is designed in such a way that the module can be scaled to suit a variety of ships. Just one or two modules could be used for smaller ships, while more modules would be installed for bigger ships.

(9) The module(s) can be installed on a range of existing or new vessels.

(10) The module is self-contained and only requires external connections for cabling and drainage. This reduces an amount of engineering needed to install the system on ships.

(11) The module can be waterproof when closed with a lid.

(12) The control system automatically lowers and stows the sail in high wind conditions or when the ships pitch/roll exceeds safe limits.

(13) The system will require little attention from the ship's crew.

(14) The system will require little ongoing maintenance.

(15) The sail can be replaced or upgraded as required when more efficient solar panels become available or with a different type of sail.

(16) The sail can either be a traditional square rigged type or a winged sail. In fact, almost any type of sail could be used as long as the sail could fit in the module.

(17) A central 'key' to enable/disable the system provides an extra level of safety.

(18) A power management and energy storage system can be installed inside the module so that energy collected via the solar panels or other devices can be stored and used when the ship is in harbor or fed into the main power system of a ship.

(19) The position of the sail will be checked before the sail can be lowered thus preventing damage to the ship or sail if the sail is out of alignment.

(20) The stored energy in the batteries could be used to lower the sail in the event that a ship lost all onboard power.

(21) The sail could be manually lowered in an emergency.

(22) The sails could be positioned during an emergency to help slow down a ship by positioning them to create the maximum amount of drag.

(23) If the batteries are installed in the module, then, the unit becomes a self-contained power source which could be used in emergencies.

Although the present invention has been explained heretofore in conjunction with attached drawings, the embodiments merely constitute one example of the present invention, and the present invention is not limited to the above-mentioned embodiments. Accordingly, it is needless to say that various modifications are conceivable corresponding to designs or the like besides the above-mentioned respective embodiments without departing from the technical concept of the present invention.

What is claimed is:

1. A power module for use in a marine vessel comprising:
a sail storage housing which has at least a portion thereof arranged below a deck of a marine vessel and having an opening on an upper end thereof, the sail storage housing having a sail storage space therein; and
a sail which is movable between a storage position located inside the sail storage housing and a use position at which the sail projects from the deck in the vertical direction;
a sail movement unit which is configured to move the sail between the storage position and the use position, the sail movement unit including:
  a sail raising and lowering device which is configured to raise or lower the sail between a horizontal state in the sail storage housing and a vertical state above the deck;
  a sail extending and retracting device which is configured to extend and retract the sail in a vertical direction; and
  a sail rotating device which is configured to rotate the sail about a longitudinal axis of the sail extending and retracting device;

a solar power generation panel which is mounted on a surface of the sail;

a solar power generation system which is configured to convert solar energy generated by the solar power generation panel into electric energy;

a posture control system which is configured to control a posture of the sail by outputting drive signals to the sail movement unit at the use position based on a wind speed, a wind direction, and information on the marine vessel; and a battery which store electric energy obtained by the solar panel generation system for allowing the sail movement unit to perform an operation of stowing the sail when a total power loss occurs on the marine vessel, wherein the power module is a self-contained power module, wherein the sail, the sail movement unit, the solar power generation panel, the solar power generation system, the posture control system, and the battery are housed inside of the sail storage space of the sail storage housing in a sail stowed state.

2. The power module for use in a marine vessel according to claim 1, wherein the power module further comprises a plurality of small-sized power modules having the same shape, and wherein the plurality of small-sized power modules are arranged on the vessel approximately uniformly in a left right symmetry with respect to a longitudinal axis of the marine vessel.

3. The power module for use in a marine vessel according to claim 1, wherein the sail storage housing has an open/close lid by which the sail storage housing is opened or closed in a waterproof manner.

4. The power module for use in a marine vessel according to claim 1, wherein the sail raising and lowering device is mounted on a bottom plate of the sail storage housing, the sail storage housing being arranged along an outer surface or an inner surface of a side wall of a hull.

5. The power module for use in a marine vessel according to claim 1, wherein the sail storage housing is mounted on one of a plurality of partition walls, the partition walls defining a space formed in the vessel below the deck into a plurality holds.

6. A wind-propelled vessel, comprising a power module mounted on a deck of the vessel, the power module comprising:

a sail storage housing which has at least a portion thereof arranged below a deck of a marine vessel and having an opening on an upper end thereof, the sail storage housing having a sail storage space therein; and a sail which is movable between a storage position located inside the sail storage housing and a use position at which the sail projects from the deck in the vertical direction;

a sail movement unit which is configured to move the sail between the storage position and the use position, the sail movement unit including:

a sail raising and lowering device which is configured to raise or lower the sail between a horizontal state in the sail storage housing and a vertical state above the deck;

a sail extending and retracting device which is configured to extend and retract the sail in a vertical direction; and a sail rotating device which is configured to rotate the sail about a longitudinal axis of the sail extending and retracting device;

a solar power generation panel which is mounted on a surface of the sail;

a solar power generation system which is configured to convert solar energy generated by the solar power generation panel into electric energy;

a posture control system which is configured to control a posture of the sail by outputting drive signals to the sail movement unit at the use position based on a wind speed, a wind direction, and information on the marine vessel; and a battery which store electric energy obtained by the solar panel generation system for allowing the sail movement unit to perform an operation of stowing the sail when a total power loss occurs on the marine vessel, wherein the power module is a self-contained power module, wherein the sail, the sail movement unit, the solar power generation panel, the solar power generation system, the posture control system, and the battery are housed inside of the sail storage space of the sail storage housing in a sail stowed state.

7. The power module for use in a marine vessel according to claim 6, wherein the power module further comprises a plurality of small-sized power modules having the same shape, and wherein the plurality of small-sized power modules are arranged on the vessel approximately uniformly in a left right symmetry with respect to a longitudinal axis of the marine vessel.

8. The power module for use in a marine vessel according to claim 6, wherein the sail storage housing has an open/close lid by which the sail storage housing is opened or closed in a waterproof manner.

9. The power module for use in a marine vessel according to claim 6, wherein the sail raising and lowering device is mounted on a bottom plate of the sail storage housing, the sail storage housing being arranged along an outer surface or an inner surface of a side wall of a hull.

10. The power module for use in a marine vessel according to claim 6, wherein the sail storage housing is mounted on one of a plurality of partition walls, the partition walls defining a space formed in the vessel below the deck into a plurality holds.

* * * * *